United States Patent
Suino et al.

(10) Patent No.: US 7,313,284 B2
(45) Date of Patent: Dec. 25, 2007

(54) IMAGE CODING APPARATUS, PROGRAM, STORAGE MEDIUM AND IMAGE CODING METHOD

(75) Inventors: Tooru Suino, Kanagawa (JP); Hiroyuki Sakuyama, Tokyo (JP); Yukio Kadowaki, Nara (JP)

(73) Assignee: Ricoh Co., Ltd., Tokyo (JP)

( * ) Notice: Subject to any disclaimer, the term of this patent is extended or adjusted under 35 U.S.C. 154(b) by 733 days.

(21) Appl. No.: 10/877,225

(22) Filed: Jun. 24, 2004

(65) Prior Publication Data

US 2004/0264785 A1    Dec. 30, 2004

(30) Foreign Application Priority Data

Jun. 27, 2003 (JP) ............................ 2003-183915
Jun. 3, 2004 (JP) ............................ 2004-165560

(51) Int. Cl.
*G06K 9/36* (2006.01)
*G06K 9/46* (2006.01)

(52) U.S. Cl. .................................................. 382/240

(58) Field of Classification Search ................ 382/162, 382/166, 173, 218, 232, 233, 240, 247, 250, 382/251; 341/50, 162; 375/240.01, 240.03, 375/240.19
See application file for complete search history.

(56) References Cited

U.S. PATENT DOCUMENTS

| | | | |
|---|---|---|---|
| 6,917,716 B2* | 7/2005 | Kajiwara et al. | 382/240 |
| 6,931,067 B2* | 8/2005 | Jang | 375/240.19 |
| 7,120,306 B2* | 10/2006 | Okada et al. | 382/240 |
| 7,196,641 B2* | 3/2007 | Huang et al. | 341/50 |
| 2003/0161536 A1* | 8/2003 | Iwamura et al. | 382/218 |
| 2004/0264785 A1* | 12/2004 | Suino et al. | 382/232 |

FOREIGN PATENT DOCUMENTS

JP    2001-109003    1/2002

* cited by examiner

*Primary Examiner*—Amir Alavi
(74) *Attorney, Agent, or Firm*—Blakely, Sokoloff, Taylor & Zafman LLP

(57) ABSTRACT

An image coding apparatus compressing and encoding image data, includes a frequency converging unit to perform frequency conversion on the image data; a bit-plane encoding unit to perform bit-plane encoding on coefficients obtained from the frequency converting unit; and a code discarding unit to discard codes obtained from the bit-plane encoding unit until a present code amount becomes a predetermined code amount. The code discarding unit includes a first discarding unit to perform the discarding operation on a basis of a first code unit; and a second discarding unit to further perform the discarding operation on a basis of a second code unit that is smaller than the first code unit, if necessary, after the discarding operation on the basis of the first code unit is performed by the first discarding unit.

29 Claims, 12 Drawing Sheets

FIG.9

QUANTIZATION TABLE

| qindex | | 3LL | 3HL | 3LH | 3HH | 2HL | 2LH | 2HH | 1HL | 1LH | 1HH |
|---|---|---|---|---|---|---|---|---|---|---|---|
| 000 | : C0 | 0 | 0 | 0 | 0 | 0 | 0 | 0 | 0 | 0 | 0 |
| 000 | : C1 | 0 | 0 | 0 | 0 | 0 | 0 | 0 | 0 | 0 | 0 |
| 000 | : C2 | 0 | 0 | 0 | 0 | 0 | 0 | 0 | 0 | 0 | 0 |
| 001 | : C0 | 0 | 0 | 0 | 0 | 0 | 0 | 0 | 0 | 0 | 0 |
| 001 | : C1 | 0 | 0 | 0 | 0 | 0 | 0 | 0 | 0 | 0 | ① |
| 001 | : C2 | 0 | 0 | 0 | 0 | 0 | 0 | 0 | 0 | 0 | 0 |
| 002 | : C0 | 0 | 0 | 0 | 0 | 0 | 0 | 0 | 0 | 0 | 0 |
| 002 | : C1 | 0 | 0 | 0 | 0 | 0 | 0 | 0 | 0 | 0 | 1 |
| 002 | : C2 | 0 | 0 | 0 | 0 | 0 | 0 | 0 | 0 | 0 | ① |
| 003 | : C0 | 0 | 0 | 0 | 0 | 0 | 0 | 0 | 0 | 0 | ① |
| 003 | : C1 | 0 | 0 | 0 | 0 | 0 | 0 | 0 | 0 | 0 | 1 |
| 003 | : C2 | 0 | 0 | 0 | 0 | 0 | 0 | 0 | 0 | 0 | 1 |
| ⋮ | | | | | | | | | | | |
| 137 | : C0 | 1 | 2 | 2 | 3 | 4 | 4 | 5 | 6 | 6 | 7 |
| 137 | : C1 | 2 | 3 | 3 | 4 | 5 | 5 | 6 | 7 | 7 | 8 |
| 137 | : C2 | 2 | 3 | 3 | 4 | 5 | 5 | 6 | 7 | 7 | 8 |
| 138 | : C0 | 1 | 2 | 2 | 3 | 4 | ⑤ | 5 | 6 | 6 | 7 |
| 138 | : C1 | 2 | 3 | 3 | 4 | 5 | 5 | 6 | 7 | 7 | 8 |
| 138 | : C2 | 2 | 3 | 3 | 4 | 5 | 5 | 6 | 7 | 7 | 8 |
| ⋮ | | | | | | | | | | | |
| 240 | : C0 | ⑧ | 8 | 8 | 8 | 8 | 8 | 8 | 8 | 8 | 8 |
| 240 | : C1 | 8 | 8 | 8 | 8 | 8 | 8 | 8 | 8 | 8 | 8 |
| 240 | : C2 | 8 | 8 | 8 | 8 | 8 | 8 | 8 | 8 | 8 | 8 |

⇒ DISCARD ONE BIT PLANE IN C0 COMPONENT OF 2LH

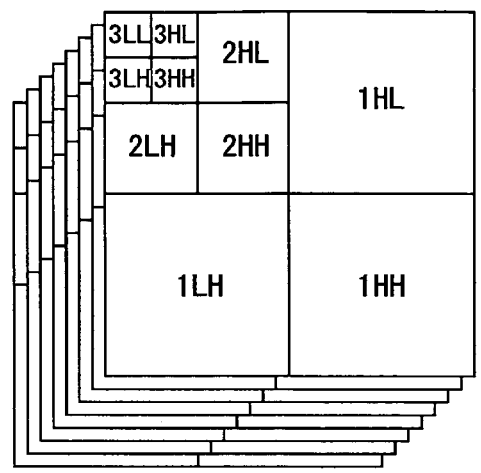
FIG.10A
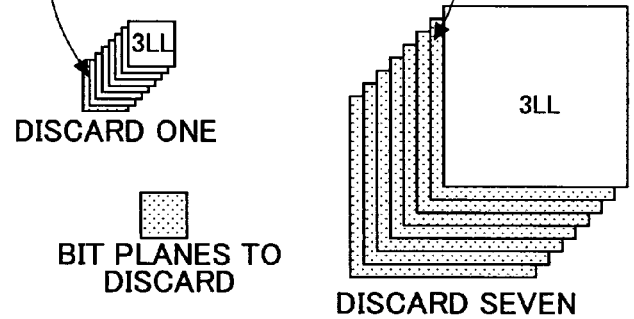
FIG.10B
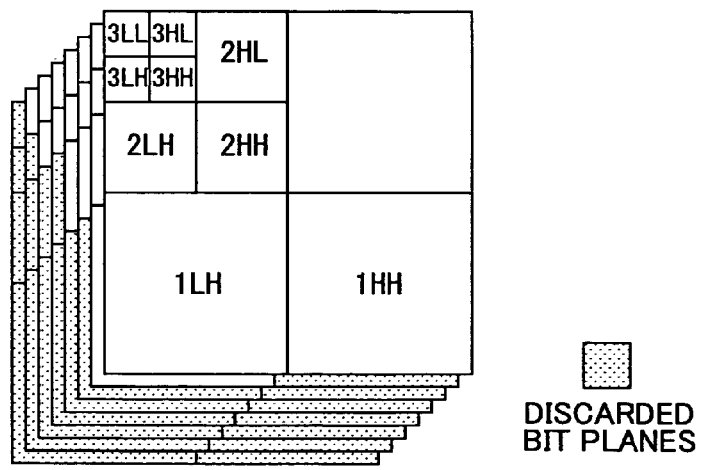
FIG.10C
FIG.10D

FIG.12A
```
qindex 3LL 3HL 3LH 3HH 2HL 2LH 2HH 1HL 1LH 1HH
137:C0  1   2   2   3   4   4   5   6   6   7
137:C1  2   3   3   4   5   5   6   7   7   8
137:C2  2   3   3   4   5   5   6   7   7   8
138:C0  1   2   2   3   4  ⑤   5   6   6   7   ⇐ SUB-BAND TO BE
138:C1  2   3   3   4   5   5   6   7   7   8      FINE-ADJUSTED:2LH
138:C2  2   3   3   4   5   5   6   7   7   8      (IN EXAMPLE OF C0)
```
FIG.12B
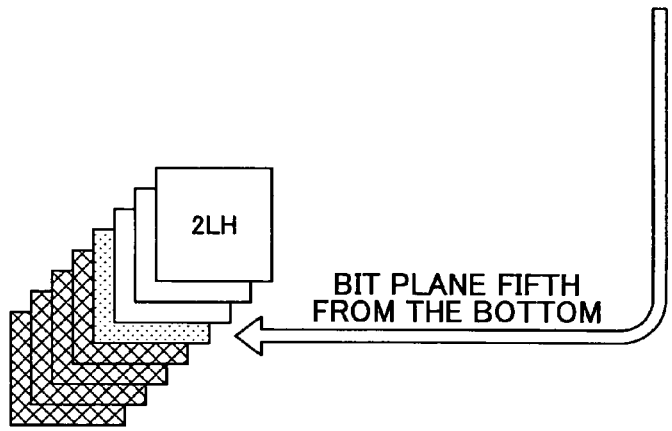
BIT PLANE FIFTH FROM THE BOTTOM
FIG.12C
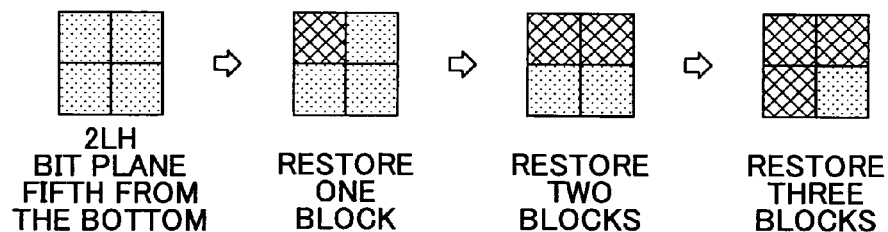
2LH BIT PLANE FIFTH FROM THE BOTTOM ⇨ RESTORE ONE BLOCK ⇨ RESTORE TWO BLOCKS ⇨ RESTORE THREE BLOCKS FIG.13A
```
qindex 3LL 3HL 3LH 3HH 2HL 2LH 2HH 1HL 1LH 1HH
138:C0  1   2   2   3   4   5   5   6   6   7
138:C1  2   3   3   4   5   5   6   7   7   8
138:C2  2   3   3   4   5   5   6   7   7   8
139:C0  1   2   2   3   4   5   5   6  ⑦   7
139:C1  2   3   3   4   5   5   6   7   7   8
139:C2  2   3   3   4   5   5   6   7   7   8
```
FIG.13B
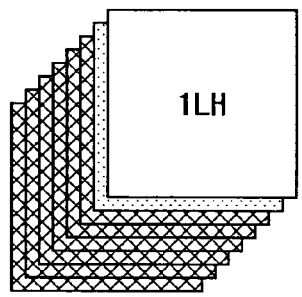
FIG.13C
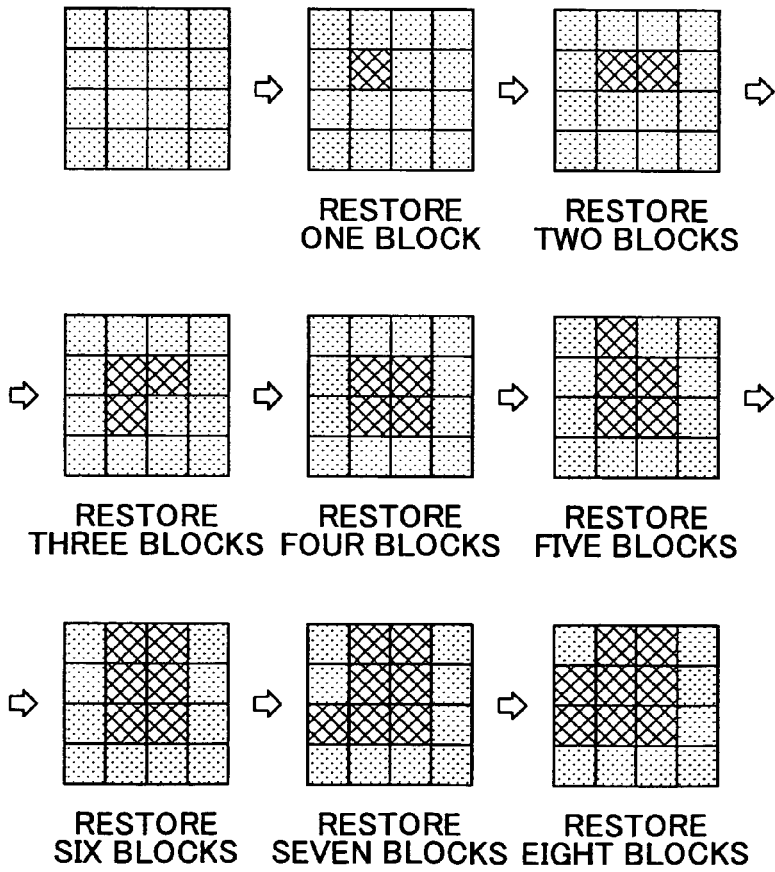
RESTORE ONE BLOCK    RESTORE TWO BLOCKS
RESTORE THREE BLOCKS    RESTORE FOUR BLOCKS    RESTORE FIVE BLOCKS
RESTORE SIX BLOCKS    RESTORE SEVEN BLOCKS    RESTORE EIGHT BLOCKS

IMAGE CODING APPARATUS, PROGRAM, STORAGE MEDIUM AND IMAGE CODING METHOD

The present application claims priority to the corresponding Japanese Application Nos. 2003-183915, filed on Jun. 27, 2003 and 2004-165560, filed on Jun. 3, 2004, the entire contents of which are hereby incorporated by reference.

BACKGROUND OF THE INVENTION

1. Field of the Invention

The present invention relates to an image coding apparatus for compressing and encoding image data, a program for controlling a computer to cause it to act as the image coding apparatus, a storage medium storing the program therein, and an image coding method for compressing and encoding image data.

2. Description of the Related Art

Recently, demand for compressing/decompressing techniques by which high-definition image data can be easily handled has increased. The so-called JPEG2000 technology is known as one compressing technology satisfying this demand, by which a high-quality image can be obtained from decoding image data, even image data once compressed at a high compression rate.

According to the JPEG2000 architecture, rate control is performed for the purpose of obtaining a predetermined code amount. In other words, codes are generated after so-called truncation processing, and then, the codes are reduced as a result of bit planes in a sub-band being discarded, plane by plane, according to a request to reduce the code amount, in an optimum order to avoid degradation in the image quality. However, in such a manner, a problematic situation may occur in which the code amount that is obtained becomes much smaller than expected.

In order to solve such a problem, Japanese Laid-open Patent Application No. 2002-34043 discloses a technology in which a predetermined code amount is obtained with the use of dummy data for achieving fine adjustment in the code amount.

Furthermore, a Lagrange's rate control method is known also for achieving fine adjustment of the code amount.

In the above-mentioned technique disclosed by Japanese Laid-open Patent Application No. 2002-34043, as mentioned above, a predetermined code amount is obtained by use of fine adjustment with the use of dummy data added thereto. However, in this case, the obtained image quality is not improved from that which existed before the dummy data is added.

According to the Lagrange's rate control method, it is necessary to apply a much smaller value as a unit value with which a code amount is controlled/adjusted when fine adjustment is performed. Therefore, considerable time may be taken for the processing, and also, the processing may become complicated accordingly.

SUMMARY OF THE INVENTION

An image coding apparatus, program, storage medium and image coding method are described. In one embodiment, the image coding apparatus for compressing and encoding given image data comprises: a frequency converging unit to perform frequency conversion on the image data, a bit-plane encoding unit to perform bit-plane encoding on coefficients obtained from the frequency converting unit, and a code discarding unit to discard codes from among those obtained from the bit-plane encoding unit until a present code amount becomes a predetermined code amount, wherein the code discarding unit comprises: a first discarding unit to perform the discarding operation on a basis of a first code unit; and a second discarding unit to further perform the discarding operation on a basis of a second code unit that is smaller than the first code unit, if necessary, after the discarding operation on the basis of the first code unit is performed by the first discarding unit.

BRIEF DESCRIPTION OF THE DRAWINGS

Other embodiments and further features of the present invention will become more apparent from the following detailed description when read in conjunction with the accompanying drawings:

FIG. 9 shows one example of a quantization table shown in FIG. 7;

FIGS. 10A through 10D illustrate relationship between the contents of the quantization table and the number of truncations (coarse adjustment) actually applied;

FIGS. 12A through 12C illustrate one example of a code amount fine adjustment method on a basis of a code block unit; and FIGS. 13A through 13C illustrate another example of a code amount fine adjustment method on a basis of a code block unit.

DETAILED DESCRIPTION OF THE PREFERRED EMBODIMENT

Figure 1:
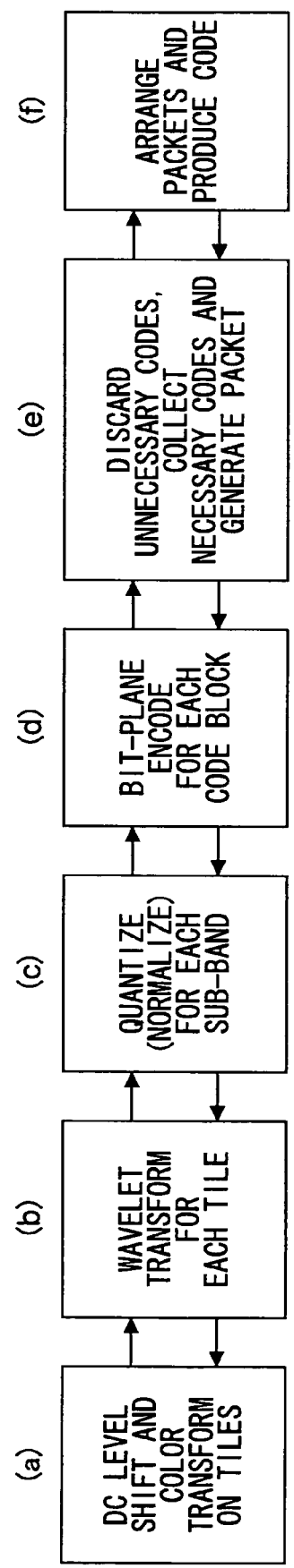
FIG. 1 illustrates processing of quantization, code discarding and image quality control according to JPEG2000.

One embodiment of the present invention has been devised for the purpose of solving such a problem, and an embodiment of the present invention comprises an image compression and encoding technique by which processing can be simplified, can be performed at high speed, and also, it is possible to improve the image quality in the fine adjustment processing.

According to one embodiment of the present invention, an image coding apparatus for compressing and encoding given image data, includes: a frequency converging unit to perform frequency conversion on the image data; a bit-plane encoding unit to perform bit-plane encoding on the coefficients obtained from the frequency converting unit; and a code discarding unit to discard codes from among the codes obtained from the bit-plane encoding unit until the present code amount becomes a predetermined target code amount, and wherein the code discarding unit includes: a first discarding unit to perform the discarding operation on the basis of a first code unit; and a second discarding unit to further perform the discarding operation on the basis of a second code unit that is smaller than the first code unit, if necessary, after the discarding operation on the basis of the first code unit is performed by the first discarding unit.

In this configuration, the code amount is first coarsely adjusted, and after that, the same is adjusted finely if necessary. Accordingly, it is possible to simplify the processing, and to achieve high-speed processing. Furthermore, it is possible to improve the image quality in the fine adjustment.

According to another embodiment of the present invention, in the configuration according to one embodiment of the present invention, when the present code amount obtained from the bit-plane encoding unit becomes less than the predetermined target code amount as a result of the discarding operation being performed by the first discarding unit on the basis of the first code unit, the second discarding unit cancels the discarding operation, once performed by the first discarding unit, on the basis of the second code unit at this time, in order to approximate the present code amount to the predetermined target code amount.

In this configuration, when the code amount becomes smaller than the target one through the coarse adjustment, the code amount can be then adjusted through the fine adjustment in which the discarding operation, once performed on a basis of a larger code unit, is cancelled at this time on a basis of a smaller code unit.

According to one embodiment of the present invention, in the above-mentioned configuration according to another embodiment of the present invention, the second discarding unit stops the operation of canceling the discarding operation before the present code amount exceeds the predetermined target code amount.

In this configuration, the operation of canceling the discarding operation can be advantageously stopped before the present code amount exceeds the target one through the fine adjustment.

According to one embodiment of the present invention, in the above-mentioned configuration according to any one of the above-described embodiments of the present invention, the discarding operation performed by the first discarding unit on the basis of the first code unit is based on a sub-band obtained from the frequency converting unit; and the discarding operation performed by the second discarding unit on the basis of the second code unit is based on a sub-block obtained as a result of the sub-band being further divided.

In this configuration, the coarse adjustment of the code amount can be performed on the basis of a sub-band unit, while the fine adjustment can be performed on the basis of a sub-block unit.

According to one embodiment of the present invention, in the above-mentioned configuration according to the one embodiment of the present invention, the frequency converting unit applies a wavelet transform as the frequency conversion.

In this configuration, compressing and encoding image data can be performed by use of a wavelet transform applied as the frequency conversion technology.

According to one embodiment of the present invention, in the above-mentioned configuration according to one embodiment of the present invention, compressing and coding the image data is performed according to a JPEG2000 algorithm.

In this configuration, compressing and coding the image data can be performed according to JPEG2000.

According to one embodiment of the present invention, in the above-mentioned configuration according to one embodiment of the present invention, a code block according to JPEG2000 is applied as the second code unit applied by the second discarding unit.

In this configuration, the fine adjustment can be performed on a basis of the code block unit according to JPEG2000.

According to one embodiment of the present invention, in the above-mentioned configuration according a previously-described embodiment of the present invention, a bit plane in a sub-band according to JPEG2000 is applied as the first code unit applied by the first discarding unit.

In this configuration, the coarse adjustment can be performed on a basis of a unit of the bit plane in the sub-band according to JPEG2000.

According to one embodiment of the present invention, in the above-mentioned configuration according to any one of the above-described embodiments of the present invention, the image coding apparatus further includes a quantizing unit that quantizes the coefficients obtained from the frequency converging unit, and provides a quantization result to the bit-plane encoding unit.

In this configuration, the coarse adjustment and the fine adjustment of the code amount can be performed on the codes obtained through the frequency conversion processing and the quantization processing.

According to one embodiment of the present invention, in the above-mentioned configuration according to one embodiment of the present invention, the code discarding unit performs the discarding operation in such an order that image degradation may be controlled to a minimum amount.

In this configuration, it is possible to perform the code discarding operation in the order in which image degradation can be controlled to the minimum amount.

According to one embodiment of the present invention, in the above-mentioned configuration according to one embodiment of the present invention, the second discarding unit discards code blocks or cancels the operation of discarding code blocks in an order of raster.

In this configuration, it is possible to discard code blocks or cancel code-block discarding operations in the order of rater for the purpose of adjusting the code amount.

According to one embodiment of the present invention, in the above-mentioned configuration according to one embodiment of the present invention, the second discarding unit discards code blocks or cancels the operation of discarding code blocks in an order such that starting from a central code block and proceeding in a direction toward an outer code block.

In this configuration, it is possible to discard code blocks or cancel code-block discarding operation in the order of starting from the central code block and then continuing in the direction toward the outer code block in adjustment of the code amount.

According to one embodiment of the present invention, in the above-mentioned configuration according to one embodiment of the present invention, the second discarding unit discards code blocks or cancels the operation of discarding code blocks in an order such that image degradation may be controlled to a minimum amount.

In this configuration, it is possible to discard code blocks or cancel code-block discarding operation in the order in which image degradation is controlled to the minimum amount, in the adjustment of the code amount.

According to one embodiment of the present invention, a computer readable program for causing a computer to perform processing of compressing and encoding image data includes instructions to cause the computer to execute the steps of: a) performing frequency conversion on given image data; b) performing bit-plane encoding on coefficients thus obtained in the step a); and c) discarding codes from among codes thus obtained in the step b) until a present code amount becomes a predetermined target code amount, wherein the step c) includes the steps of: c-1) performing the discarding operation on a basis of a first code unit; and c-2) further performing the discarding operation on a basis of a second code unit that is smaller than the first code unit, if necessary, after the discarding operation performed on the basis of the first code unit in the step c-1).

In this configuration, the code amount is first coarsely adjusted, and after that, the same is adjusted finely. Accordingly, it is possible to simplify the processing, and to achieve high-speed processing. Furthermore, it is possible to improve the image quality in the fine adjustment processing.

According to one embodiment of the present invention, in the configuration according to one embodiment of the present invention, when the present code amount obtained in the bit-plane encoding step becomes less than the predetermined target code amount as a result of the discarding operation on the basis of the first code unit being performed in the first discarding step, the second discarding step to cancel the discarding operation on the basis of the second code unit is performed in order to approximate the present code amount to the predetermined target code amount.

In this configuration, when the code amount becomes smaller than the target one through the coarse adjustment processing, the code amount can be then adjusted through the fine adjustment processing in which the discarding operation is cancelled on a basis of the smaller code unit.

According to one embodiment of the present invention, in the above-mentioned configuration according to one embodiment of the present invention, the second discarding step to perform the operation of canceling the discarding operation is stopped before the present code amount exceeds the predetermined target code amount.

In this configuration, the operation of canceling the discarding operation in the fine adjustment manner can be stopped before the present code amount exceeds the target one.

According to one embodiment of the present invention, a storage medium is provided to store therein the program according to any one of the above-mentioned embodiments of the present invention.

In this configuration, with the use of the program stored in the storage medium, the functions and advantages same as those described above for the relevant program according to any one of the previously-described embodiments of the present invention can be obtained.

First, quantization, code discarding and image quality control according to JPEG2000 are roughly described. Code processing according to JPEG2000 is proceeded with as shown in FIG. 1 in general. That is, when image data is compressed, a given image is divided into tiles, DC level shift and color transform are performed thereon (Step (a)), a wavelet transform is performed thereon for each tile (Step (b)), and quantization is performed thereon for each sub-band (Step (c)). Then, bit-plane encoding is performed for each code block (Step (d)). After that, unnecessary codes are discarded, necessary codes are collected, and thus, packets are generated. After that, the packets are lined up and thus, codes are produced (Step (f)). In a case where the thus-compressed code is decompressed, these steps should be performed in the reverse order.

Figure 2:
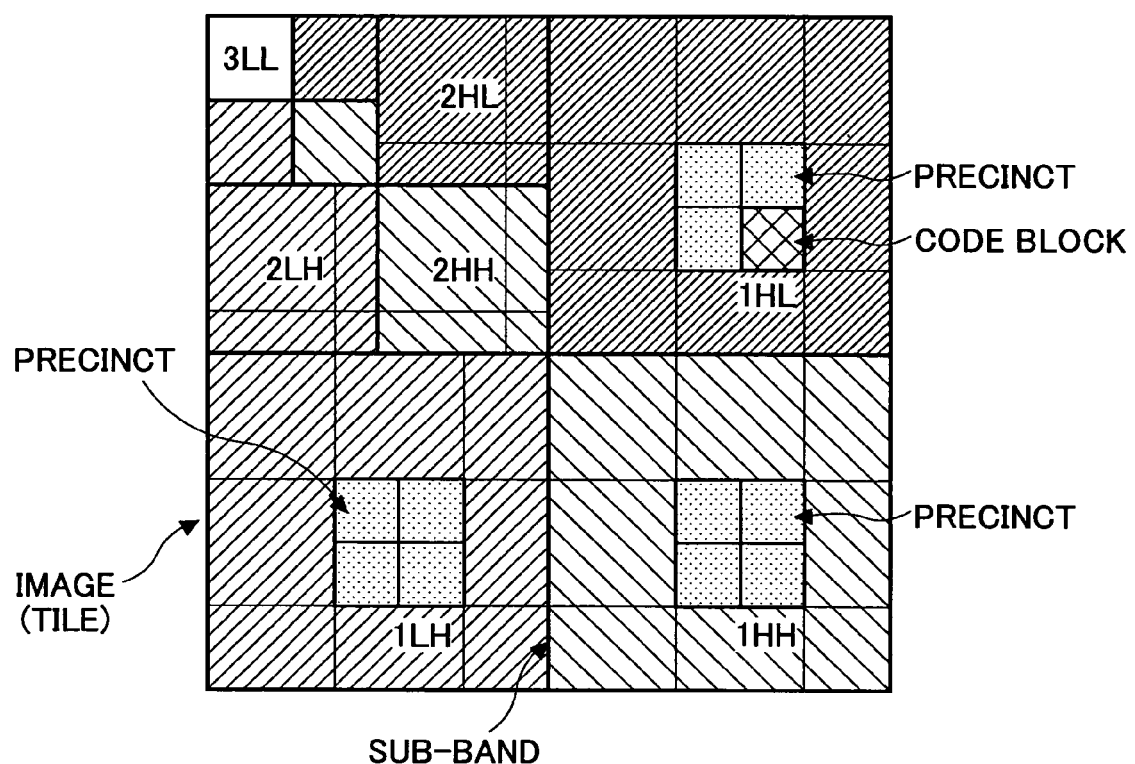
FIG. 2 illustrates relationship among concepts of an image, tiles, sub-bands, precincts and code blocks.

FIG. 2 illustrates relationship among concepts of a given image, tiles, sub-bands, precincts and code blocks according to JPEG2000. Tiles are units obtained as a result of a give image being divided into rectangles. When the number of division is '1', 'the given image'='the single tile'. According to JPEG2000, each particular tile is regarded as an independent image, a wavelet transform is performed thereon, and sub-bands are generated therefrom. According to a basic architecture, in the case of applying a 9×7 transform as the wavelet transform, it is possible that coefficients included in the same sub-bands are divided by the common number, and thus linear quantization is achieved. Accordingly, image quality control by use of linear quantization can be achieved on a sub-band unit basis. In other words, a unit applied when an image quality control is performed by use of linear quantization is a sub-band.

Precincts are those obtained as a result of each sub-band being divided into rectangles (each having a size designateable by a user), which are then collected for three sub-bands, i.e., HL, LH and HH. Such three precincts are regarded as a unit. Thus, each precinct roughly represents a position in the given image. It is possible to set the size of the precinct to be the same as that of the sub-band. Code blocks are obtained when each precinct is further divided into rectangles each having a size designatable by a user.

Coefficients in the sub-band after being quantized then undergo bit-plane encoding on a basis of a code block unit. There, each bit plane is decomposed into three sub-bit planes, and are encoded. A packet is produced as a result of part of the codes being extracted from all the code blocks included in the precinct and then being collected. For example, the packet is produced as a result of the codes in a series of three bit planes including those of the MSB and the other two subsequent thereto being collected. The above-mentioned 'part of the codes' may include null ones, and, in such a case, there may be a case where the contents of the packet are 'null' in terms of codes.

By collecting these packets for all the precincts including all the code blocks and all the sub-bands, the corresponding part of the given image is obtained. For example, the codes of the series of three bit planes starting from the MSB of the wavelet coefficients for the entirety of the given image area are obtained, which are called a 'layer.' It can be roughly said that the layer includes the part of the codes of the bit planes for the entirety of the given image area. Accordingly as the number of layers to decode increases, the obtained image quality finally increases. Therefore, it can be said that the number of layers is a concept to measure the image quality, or the layers are units to measure the image quality.

Figure 3:
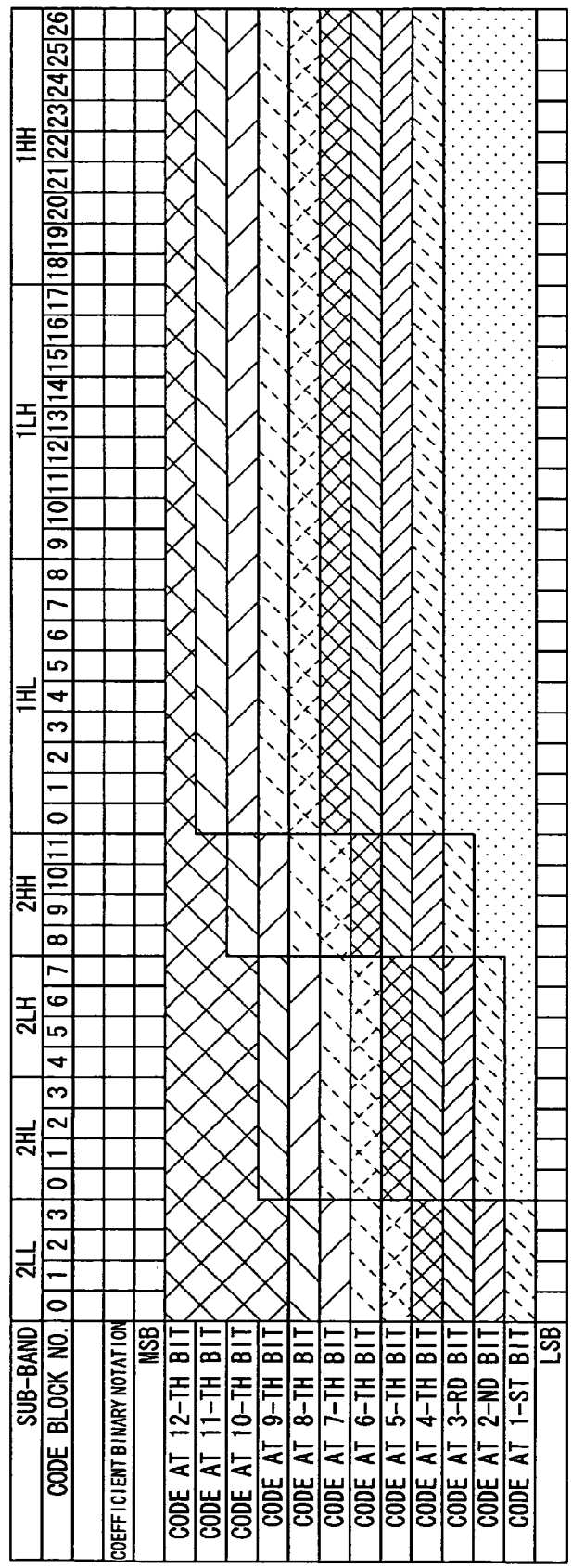
FIG. 3 illustrates an example of a concept of 'layers' in which the number of levels of wavelet transform is 2, and a size of the precinct is applied as a size of the sub-band.
Figure 4:
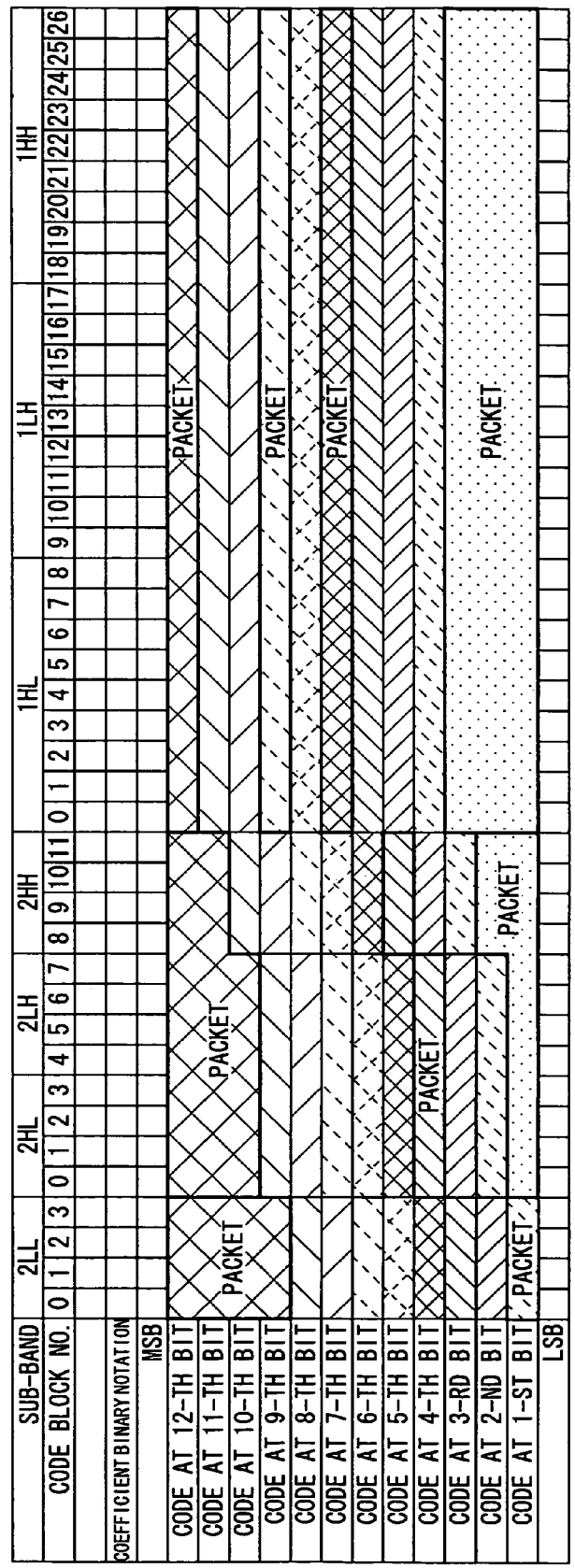
FIG. 4 illustrates packets included in the layers illustrated in FIG. 3.

When all the layers are collected, the codes in all of the bit planes for the entirety of the given image area are obtained. FIG. 3 illustrates the layers in an example in which 'the number of levels (decomposition levels) of the wavelet transform'=2, and 'the size of precinct'='the size of sub-band', while, FIG. 4 illustrates the packets included therein. In this case, since an architecture in which 'the precinct size'='the sib-band size', and thus, the size of the code block is same as the size of the sub-band is applied, each sub-band (2LL, 2HL, 2HL or 2HH) on the decomposition level 2 is divided into the four code blocks (0 through 3), while each sub-band (1HL, 1LH or 1HH) on the decomposition level 2 is divided into the nine code blocks (0 through 8), as shown. Since each packet is made up with precincts as units therefor, each packet includes the sub-bands of HL through HH, as shown in FIG. 4, in the case where the precinct=sub-band. For easier understanding, some of the packets are bordered by bold lines, in FIG. 4.

As mentioned above, a packet is one obtained from extracting part of the codes included in the code blocks and collecting them. There, unnecessary codes are not used for generating the packets. For example, the codes in the bit planes of less significant bits included in the layer No. 9, for example, as shown in FIG. 3, are normally discarded.

Accordingly, according to JPEG2000, image quality control with the use of code discarding can be achieved on a basis of a code block unit (or a sub-bit plane unit). It is noted that an order of the packets is called 'progression order'.

An embodiment of the present invention is described next.

Figure 5:
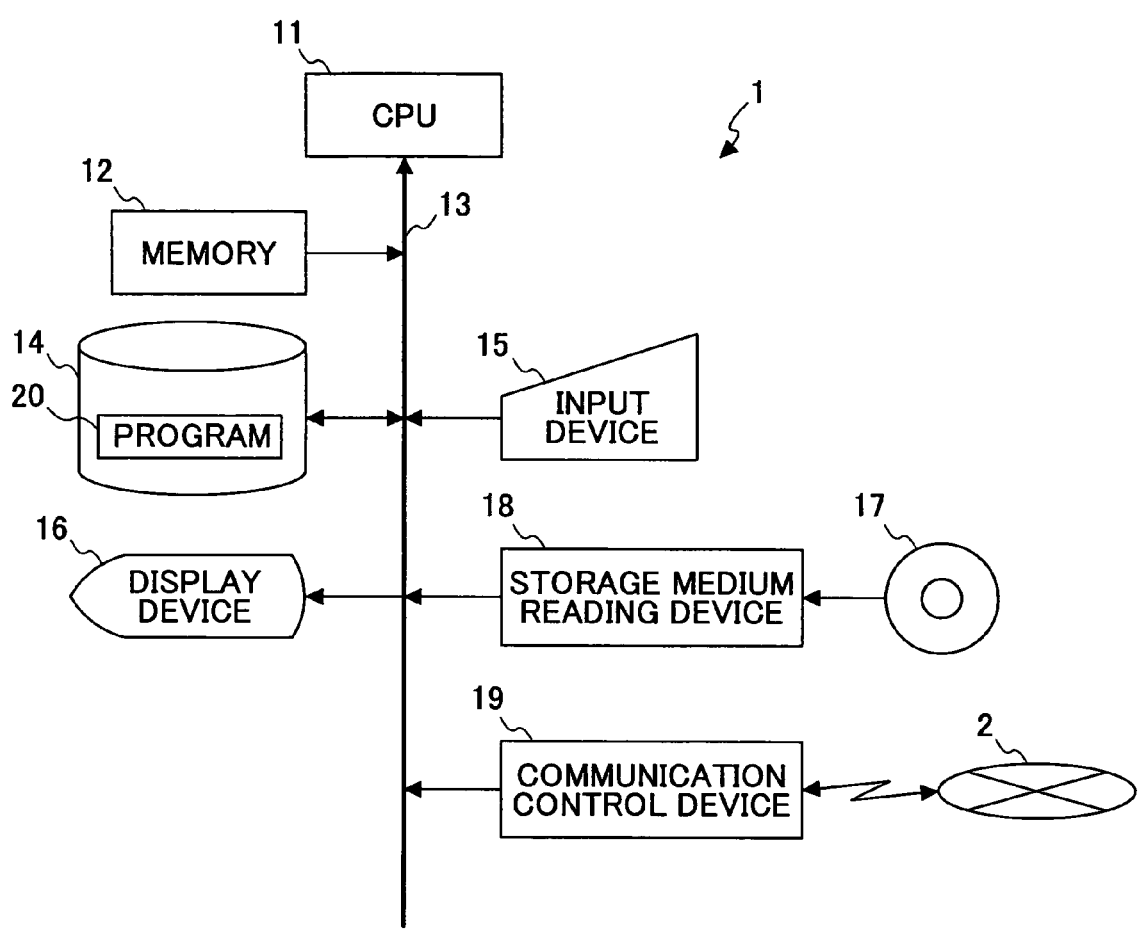
FIG. 5 shows a block diagram illustrating electrical connection in an image coding apparatus according to one embodiment of the present invention.

FIG. 5 shows a block diagram showing electrical connection of an image compression and coding apparatus 1 in one embodiment of the present invention. The image compression and coding apparatus 1 includes, as shown, a CPU 11 that performs various sorts of operations and centrally controls respective parts of the apparatus, a memory 12 including various types of storage devices such as ROMs and RAMs, and a bus 13.

To the bus 13, a magnetic storage device 14 such as a hard disk drive device, an input device such as a keyboard, a mouse or such, a display device 16 and a storage medium reading device 18 reading from a storage device 17 such as an optical disk are connected via predetermined interfaces. Further, a predetermined communication interface 19 is also connected to the bus 13, which performs communications externally via a communication network 2. As the storage medium 17, various sorts of media such as an optical disk such as a CD, a DVD or such, a magneto-optical disk, a flexible disk or such may be applied. As the storage medium reading device 18, specifically, an optical disk drive device, a magneto-optical disk drive device, a flexible disk drive device or such may be applied according to a particular type of the storage medium 17 applied.

The image compression and coding apparatus 1 reads programs 20 according to an embodiment of the present invention from the storage medium 17, and installs the programs 20 in the magnetic storage device 14. These programs 20 may instead be installed in the magnetic storage device 14 after they are downloaded externally via the communication network 2 such as the Internet. After the installation of the programs 20, the image compression and coding apparatus 1 can execute predetermined processing described later as a result of the CPU 11 executing them. The programs 20 may operate on a predetermined OS (operating system) there.

Figure 6:
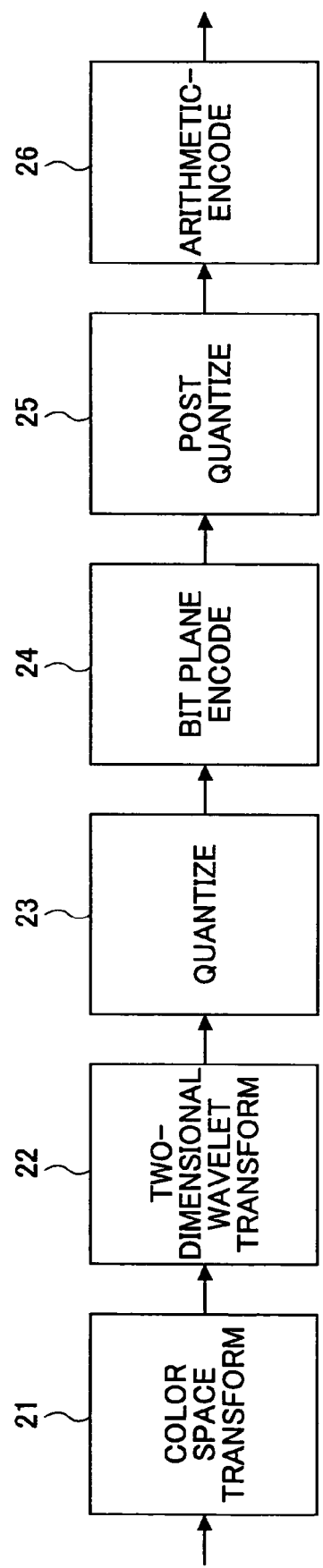
FIG. 6 shows a functional block diagram of an image compressing and coding apparatus according to one embodiment of the present invention.

FIG. 6 shows a functional block diagram of the image compression and coding apparatus 1 that is embodied based on the programs 20. As shown, a color space transform unit 21 transforms a color space of given image data from an RGB space into a YUV space or a YcbCr space, a two-dimensional wavelet transform unit 22 acts as a frequency converting unit, executes a frequency converting step, and performs two-dimensional wavelet transform on the image data having undergone the cooler space transform processing for each color component. A quantize unit 23 divides wavelet coefficients obtained from the wavelet transform processing with the use of an appropriate quantization denominator for each sub-band. A bit-plane encoding unit 24 acts as a bit-plane encoding unit, executes a bit-plane encoding step, and creates codes before undergoing code discard processing. A post quantize unit 25 acts as a code discarding unit, executes a code discarding step, and performs bit truncation (discarding of codes) as well as code amount fine adjustment, if necessary. An arithmetic-encoding unit 26 produces codes according to a code format of JPEG2000.

Figure 7:
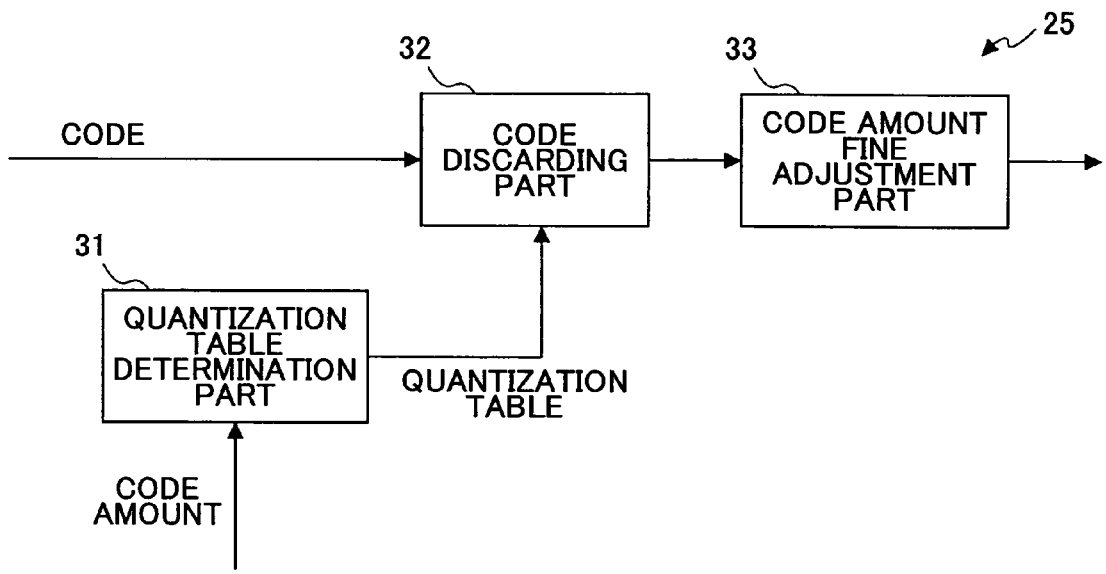
FIG. 7 shows a functional block diagram of a post quantization unit shown in FIG. 6.

FIG. 7 shows a functional block diagram of the post quantize unit 25. As shown, a quantization unit 31 included therein selects a predetermined table (quantization table) according to a code amount of given codes. A code discarding unit 32 acts as a first discarding unit, executes a first discarding step, and, according to the thus-selected quantization table, discards codes from among the given codes until the present code amount becomes equal to a predetermined target code amount. When codes have been discarded too much, a code amount fine adjustment unit 33 that acts as a second discarding unit and executes a second discarding step performs fine adjustment processing.

Figure 8:
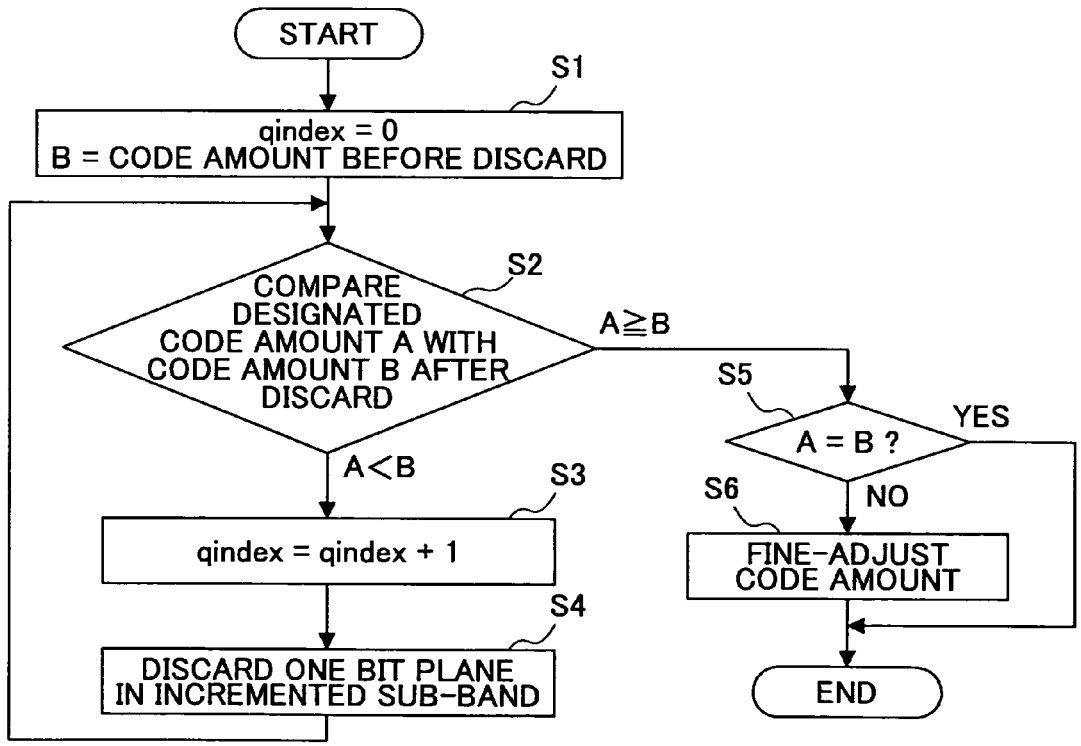
FIG. 8 shows a flow chart of processing executed by a code discarding unit, which performs coarse adjustment of a code amount, shown in FIG. 7.

FIG. 8 shows a flow chart of processing that the code discarding unit 32 executes. FIG. 9 illustrates an example of a configuration of the above-mentioned quantization table. In the quantization table shown in FIG. 9, the number of bit planes of codes to be discarded for the respective sub-bands of each component is described for each index 'qindex'. The index 'qindex' indicates the total number of bit planes to discard. The index 'qindex' starts from "qindex=0" in which no bit is discarded, in Step S1 of FIG. 8. 'B' denotes a code amount before code discard processing is performed. Then, in Step S2, the code amount B is compared with a predetermined target code amount A. When the current code amount B is larger (A<B) in Step S2, the index 'qindex' is incremented by one in Step S3. Then, a bit plane corresponding to a sub-band in which the number of bit planes to discard increases in response to the incrementing of 'qindex' in the quantization table shown in FIG. 9 (corresponding to the numerals enclosed by circles in the figure) is discarded in Step S4. This processing is called 'coarse adjustment of the bit amount' with respect to 'fine adjustment of the code amount' performed in Step S6 and described later with reference to FIG. 11. After that, the processing retunes to Step S2 in which the current code amount B, which decreases in response to the discarding processing performed in Step S4, is again compared with the predetermined target code amount A. Then, when "A=B," i.e., "A≧B" in Step S2 and also "Yes" in Step S5, the current processing in the code discarding unit 32 is finished without performing code amount fine adjustment. However, when "A>B," i.e., "A≧B" in Step S2 and "No" in Step S5, this means that codes have been discarded too much, code amount fine adjustment processing (described later with reference to FIG. 11) is performed in Step S6. After that, the current processing in the code discarding unit 32 is finished.

In the quantization table shown in FIG. 9, the index 'qindex' denotes the total number of bit planes to discard as mentioned above, while C0, C1 and C2 denote color components, respectively. The present example is an example in which the number of decomposition levels is 3, and thus, total ten sub-bands (3LL, 3HL, 3LH, 3HH, 2HL, 2LH, 2HH, 1HL, 1LH and 1HH) exist for each color component, as shown. Since the number of color components is 3, total 30 sub-bands finally exist accordingly in this example. As 'qindex' increases one by one, the number of bit planes to discard increases one by one. The order in which the sub-band for which the bit plane is discarded is selected is not limited to that shown in FIG. 9, and any other order may also be applied, as long as image degradation occurring thereby can be controlled to the minimum amount. For example, when 'qindex' is incremented from 137 to 138, the number of bit planes that is incremented accordingly is 2LH (C0) in the table of FIG. 9. This means that, when 'qindex' becomes 138, the bit plane in 2LH of C0 is discarded.

FIGS. 10A through 10D illustrate a relationship between the contents in the quantization table and the number of truncation or the number of bit planes to discard accordingly. FIG. 10A shows an example of codes in a state before truncation. As mentioned above, in this example, the number of color components is 3, and FIG. 10A shows codes in one (C0) thereof. Further, in this example, the number of the decompositions levels is 3. As shown in FIG. 10A, the codes are divided into the ten sub-bands (3LL, 3HL, 3LH, 3HH, 2HL, 2LH, 2HH, 1HL, 1LH and 1HH) two-dimensionally, and also, have eight bit planes in the depth direction, as shown. Instead, it is also possible to further divide each bit plane into three sub-bit planes as mentioned above.

FIG. 10B illustrates one example of the quantization table. The same as in FIG. 9, the number of bit planes to discard is described for each color component, and for each sub-band.

FIG. 10C illustrates an example of truncation operation (discard of bit planes; thus, corresponding to coarse attunement of the code amount) with the use of the quantization table shown in FIG. 10B. Also FIG. 10C shows an example in the color component of C0. The number '1' is designated in 3LL in the color component C0 in the quantization table shown in FIG. 10B. Accordingly, one bit plane from among the eight ones is discarded in 3LL, as shown in FIG. 10C. Similarly, the number '7' is designated in 1HH in the color component C0 in the quantization table shown in FIG. 10B. Accordingly, seven bit planes from among the eight ones are discarded in 1HH, as shown in FIG. 10C. In FIG. 10C, the bit planes to discard are distinguished with halftone dots. FIG. 10D shows a state of the codes for the color component C0 having already undergone the truncation performed for all the sub-bands according to the contents in the quantization table shown in FIG. 10B. In the figure, the bit planes thus discarded accordingly are distinguished by halftone dots.

Figure 11:
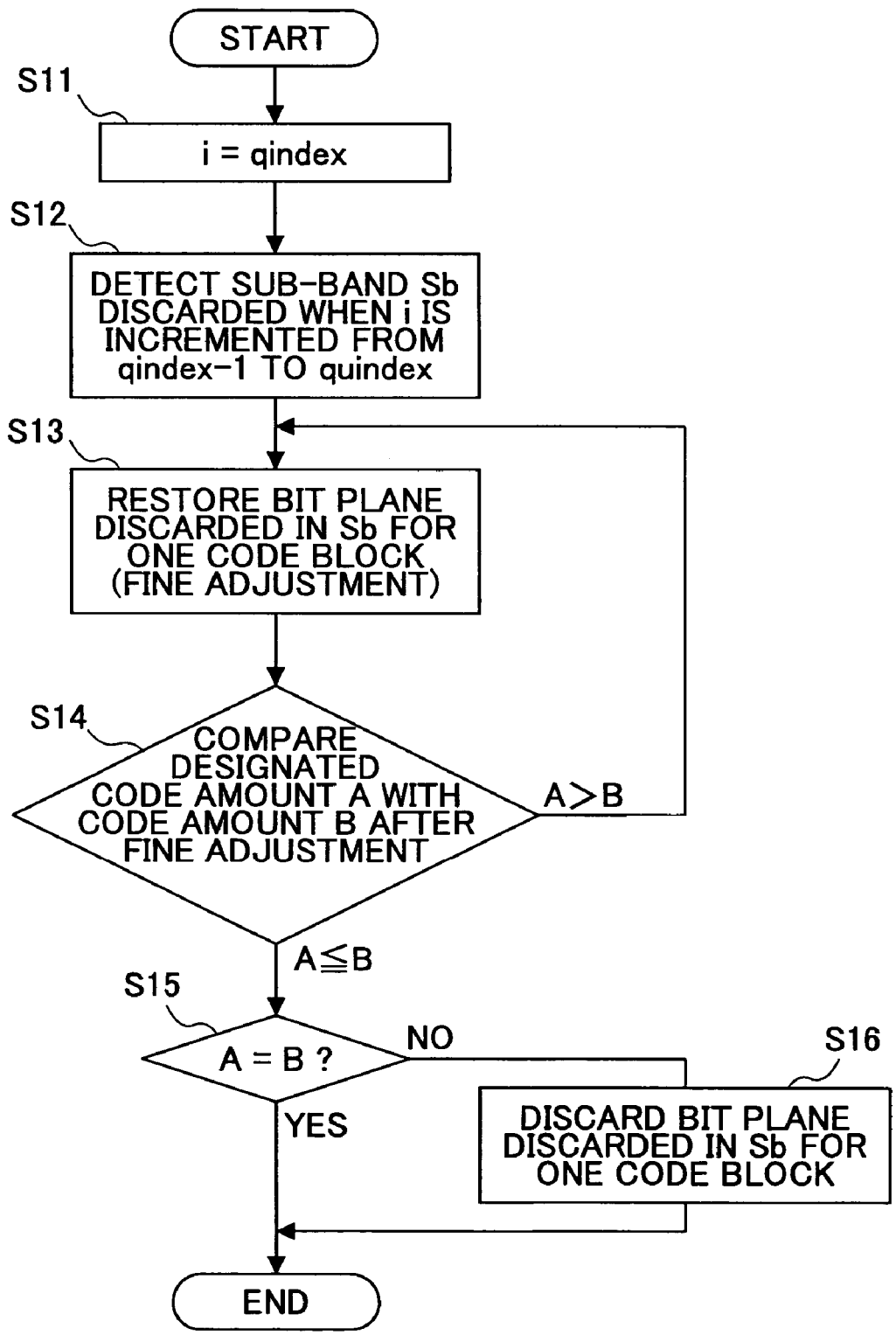
FIG. 11 shows a flow chart of processing executed by a code amount fine adjustment unit shown in FIG. 7.

FIG. 11 shows a flow chart of processing in Step S6 of FIG. 8 executed by the code amount fine adjustment unit 33. First, the value in 'qindex' is set in a variant 'i' in Step S11. Then, the sub-band Sb for which the bit plane has been discarded when the variant 'i' is changed from 'qindex−1' into 'qindex' is determined in Step S12. Then, the bit plane discarded in the thus-determined sub-band Sb is restored for one code block in Step S13 (fine adjustment). This process is repeated while the designated code amount A mentioned above is larger than the current code amount B after this fine adjustment operation has been performed (A>B in Step S14). Then, when the code amount B after the fine adjustment operation has been performed becomes equal to the designated code amount A (A≦B in Step S14 and Yes in Step S15), the fine adjustment process is finished. On the other hand, when the code amount B after the fine adjustment operation has been performed exceeds the designated code amount B (A≦B in Step S14, and No in Step S15), the code block once restored is discarded again in Step S16, which code block is one once restored in Step S13 and results in the situation in which the code amount B has exceeded as mentioned above, and the current processing of fine adjustment is finished.

FIGS. 12A through 12C illustrate an example of a method of fine adjustment operation for a code amount on a basis of a code block unit. In this example, it is assumed that, when 'qindex' is incremented from 137 to 138, the code amount B after the code discarding processing, performed in Step S4 in FIG. 8 becomes smaller than the designated code amount A (No in Step S5), and this means codes have been discarded too much in the coarse adjustment processing. Since the number designated in the sub-band 2LH in the component C0 increases from 4 to 5 at this time (enclosed by a circle) as shown in FIG. 12A, and thus, the fifth bit plane from the bottom has been discarded there as shown in FIG. 12B, this bit plane should be restored in the fine adjustment operation. Specifically, the relevant discarding operation once performed currently in the coarse adjustment processing shown in FIG. 8 is canceled for each code block unit, as shown in FIG. 12C. In this example, cancellation of the discarding operation (or code restoration for each code block) is performed in an order of raster as shown in FIG. 12. Since the number of code blocks in the sub-band is four, the fine adjustment is performed in a manner such that the code amount B that is smaller than and closest to the designated code amount A is discovered while the cancellation of the discarding operation or code block restoration is performed for one through three code blocks as shown in FIG. 12C. The discard cancellation operation or restoration operation is finished when the value B becomes closest to the value A.

FIGS. 13A through 13C illustrate another example of the method of fine adjustment for a code amount on a basis of a code block unit. In this example, it is assumed that, when 'qindex' is incremented from 138 to 139, the code amount B after code discarding processing becomes smaller than the designated code amount A. Since the sub-band incremented at this time is 1LH in the C0 component and the seventh bit plane from the bottom has been discarded there as shown in FIGS. 13A and 13B, this bit plane is restored for each code block, i.e., the relevant discarding operation once performed currently on the bit plane is canceled, for each code block unit, as shown in FIG. 13C. In this example, cancellation of the discarding operation is performed in such an order from the central code block to the outer code block gradually as shown in FIG. 13C. Since the number of code blocks in the sub-band is sixteen in this case, the fine adjustment is performed in a manner such that the code amount B that is smaller than and also closest to the designated code amount A is found out while the cancellation of the discarding operation is performed for one through fifteen code blocks. The discard cancellation operation or restoration operation is finished when the value B becomes closest to the value A.

The order in which the discarding operation is cancelled or the once discarded codes are restored is not limited to those shown in FIG. 12C or 13C, and, any other order may be applied instead in a manner in which optimum visual characteristics may be obtained finally after the relevant codes are decoded/decompressed. For example, there is a method in which discarding operation is cancelled or code restoration is performed from a code block having a large code amount from among code blocks in a relevant sub-band in a relevant bit plane. Furthermore, for example, assuming that a distortion is denoted by ΔD and a compression rate change is denoted by ΔR, there is a method in which discarding operation is cancelled from a code block having a large 'ΔD/ΔR' from among code blocks in a relevant sub-band in a relevant bit plane.

Further, the present invention is not limited to the above-described embodiments, and variations and modifications may be made without departing from the basic concept of the present invention claimed below.

The present application is based on Japanese priority application Nos. 2003-183915, filed on Jun. 27, 2003 and 2004-165560, filed on Jun. 3, 2004, the entire contents of which are hereby incorporated by reference.

What is claimed is:

1. An image coding apparatus for compressing and encoding given image data, comprising:
    a frequency converging unit to perform frequency conversion on the image data;
    a bit-plane encoding unit to perform bit-plane encoding on coefficients obtained from the frequency converting unit; and
    a code discarding unit to discard codes from among those obtained from the bit-plane encoding unit until a present code amount becomes a predetermined code amount, wherein:
        the code discarding unit comprises
            a first discarding unit to perform the discarding operation on a basis of a first code unit; and
            a second discarding unit to further perform the discarding operation on a basis of a second code unit that is smaller than the first code unit, if necessary, after the discarding operation on the basis of the first code unit is performed by the first discarding unit.

2. The image coding apparatus as claimed in claim 1, wherein:
    when the present code amount obtained from the bit-plane encoding unit becomes less than the predetermined code amount as a result of the discarding operation on the basis of the first code unit being performed by the first discarding unit, the second discarding unit cancels the discarding operation on the basis of the second code unit in order to approximate the present code amount to the predetermined code amount.

3. The image coding apparatus as claimed in claim 2, wherein:
    the second discarding unit stops the operation of canceling the discarding operation before the present code amount exceeds the predetermined code amount.

4. The image coding apparatus as claimed in claim 1, wherein:
    the discarding operation on the basis of the first code unit performed by the first discarding unit is based on a sub-band obtained from the frequency converting unit; and
    the discarding operation on the basis of the second code unit performed by the second discarding unit is based on a sub-block obtained as a result of the sub-band being further divided.

5. The image coding apparatus as claimed in claim 4, wherein:
    the frequency converting unit applies a wavelet transform as the frequency conversion.

6. The image coding apparatus as claimed in claim 5, compressing and coding of the image data according to JPEG2000.

7. The image coding apparatus as claimed in claim 6, wherein:
    a code block according to JPEG2000 is applied as the second code unit in the second discarding unit.

8. The image coding apparatus as claimed in claim 7, wherein:
    the second discarding unit discards a code block or cancels code block discarding operation in an order of raster.

9. The image coding apparatus as claimed in claim 7, wherein:
    the second discarding unit discards a code block or cancels code block discarding operation starting at a central code block and proceeding in a direction toward an outer code block.

10. The image coding apparatus as claimed in claim 7, wherein:
    the second discarding unit discards code blocks or cancels code block discarding operation in an order such that image degradation may be controlled to a reduced amount.

11. The image coding apparatus as claimed in claim 6, wherein:
    a bit plane in a sub-band according to JPEG2000 is applied as the first code unit applied in the first discarding unit.

12. The image coding apparatus as claimed in claim 1, further comprising a quantizing unit to quantize the coefficients obtained from the frequency converging unit, and provide a quantization result to the bit-plane encoding unit.

13. The image coding apparatus as claimed in claim 12, wherein:
    the code discarding unit performs the discarding operation in such an order that image degradation may be controlled to a reduced amount.

14. An article of manufacture having one or more recordable media storing a computer readable program having instructions which, when executed by a computer causes the computer to perform processing of compressing and encoding given image data by:
    a) performing frequency conversion on the image data;
    b) performing bit-plane encoding on coefficients obtained from performing frequency conversion; and
    c) discarding codes from among the codes obtained from performing bit-plane encoding until a present code amount becomes a predetermined code amount, wherein discarding codes from among the codes comprises:
        c-1) performing the discarding operation on a basis of a first code unit; and
        c-2) further performing the discarding operation on a basis of a second code unit that is smaller than the first code unit, if necessary, after performing the discarding operation.

15. The article of manufacture as claimed in claim 14, wherein:
    when the present code amount obtained from performing bit-plane encoding becomes less than the predetermined code amount as a result of the discarding operation on the basis of the first code unit is performed when performing the discarding operation, the discarding operation is cancelled on the basis of the second code unit when further performing the discarding operation in order to approximate the present code amount to the predetermined code amount.

16. The article of manufacture as claimed in claim 15, wherein:
    the operation of canceling the discarding operation when further performing the discarding operation is stopped before the present code amount exceeds the predetermined code amount.

17. A method of compressing and encoding given image data, comprising:
    a) performing frequency conversion on the image data;
    b) performing bit-plane encoding on coefficients obtained from performing frequency conversion; and
    c) discarding codes from among the codes obtained from performing bit-plane encoding until a present code amount becomes a predetermined code amount, wherein discarding codes from among the codes comprises
- c-1) performing the discarding operation on a basis of a first code unit; and
- c-2) further performing the discarding operation on a basis of a second code unit that is smaller than the first code unit, if necessary, after the discarding operation on the basis of the first code unit is performed in performing the discarding operation.

18. The method as claimed in claim 17, wherein:
when the present code amount obtained from performing bit-plane encoding becomes less than the predetermined code amount as a result of the discarding operation on the basis of the first code unit is performed when performing the discarding operation, the discarding operation is cancelled on the basis of the second code unit when further performing the discarding operation in order to approximate the present code amount to the predetermined code amount.

19. The method as claimed in claim 18, wherein:
the operation of canceling the discarding operation when further performing the discarding operation is stopped before the present code amount exceeds the predetermined code amount.

20. The method as claimed in claim 17, wherein:
the discarding operation on the basis of the first code unit performed when performing the discarding operation is based on a sub-band obtained from performing frequency conversion; and
the discarding operation on the basis of the second code unit performed when further performing the discarding operation is based on a sub-block obtained as a result of the sub-band being further divided.

21. The method as claimed in claim 20, wherein:
in performing bit-plane encoding, wavelet transform is applied as the frequency conversion.

22. The method as claimed in claim 21, wherein:
compressing and coding of the image data is performed according to JPEG2000.

23. The method as claimed in claim 22, wherein:
a code block according to JPEG2000 is applied as the second code unit when further performing the discarding operation.

24. The method as claimed in claim 23, wherein:
when further performing the discarding operation, a code block is discarded or code block discarding operation is cancelled in an order of raster.

25. The method as claimed in claim 23, wherein:
when further performing the discarding operation, a code block is discarded or code block discarding operation is cancelled in an order of starting from a central code block and then proceeded in a direction toward an outer code block.

26. The method as claimed in claim 23, wherein:
when further performing the discarding operation, a code block is discarded or code block discarding operation is cancelled in an order such that image degradation may be controlled to a reduced amount.

27. The method as claimed in claim 22, wherein:
a bit plane in a sub-band according to JPEG2000 is applied as the first code unit applied when performing the discarding operation.

28. The method as claimed in claim 17, further comprising quantizing the coefficients obtained in performing frequency conversion, and providing a quantization result for use when performing bit-plane encoding.

29. The method as claimed in claim 28, wherein:
in discarding codes, the discarding operation is performed in such an order that image degradation may be controlled to a minimum amount.

* * * * *

UNITED STATES PATENT AND TRADEMARK OFFICE
CERTIFICATE OF CORRECTION

PATENT NO.        : 7,313,284 B2                                    Page 1 of 1
APPLICATION NO.   : 10/877225
DATED             : December 25, 2007
INVENTOR(S)       : Tooru Suino et al.

It is certified that error appears in the above-identified patent and that said Letters Patent is hereby corrected as shown below:

Title page, item (73) Assignee, please delete "Ricoh Co., Ltd., Tokyo (JP)" and insert -- Ricoh Company, Ltd., Tokyo (JP) --.

Signed and Sealed this

Eleventh Day of November, 2008

JON W. DUDAS
*Director of the United States Patent and Trademark Office*